United States Patent Office 3,383,139
Patented May 14, 1968

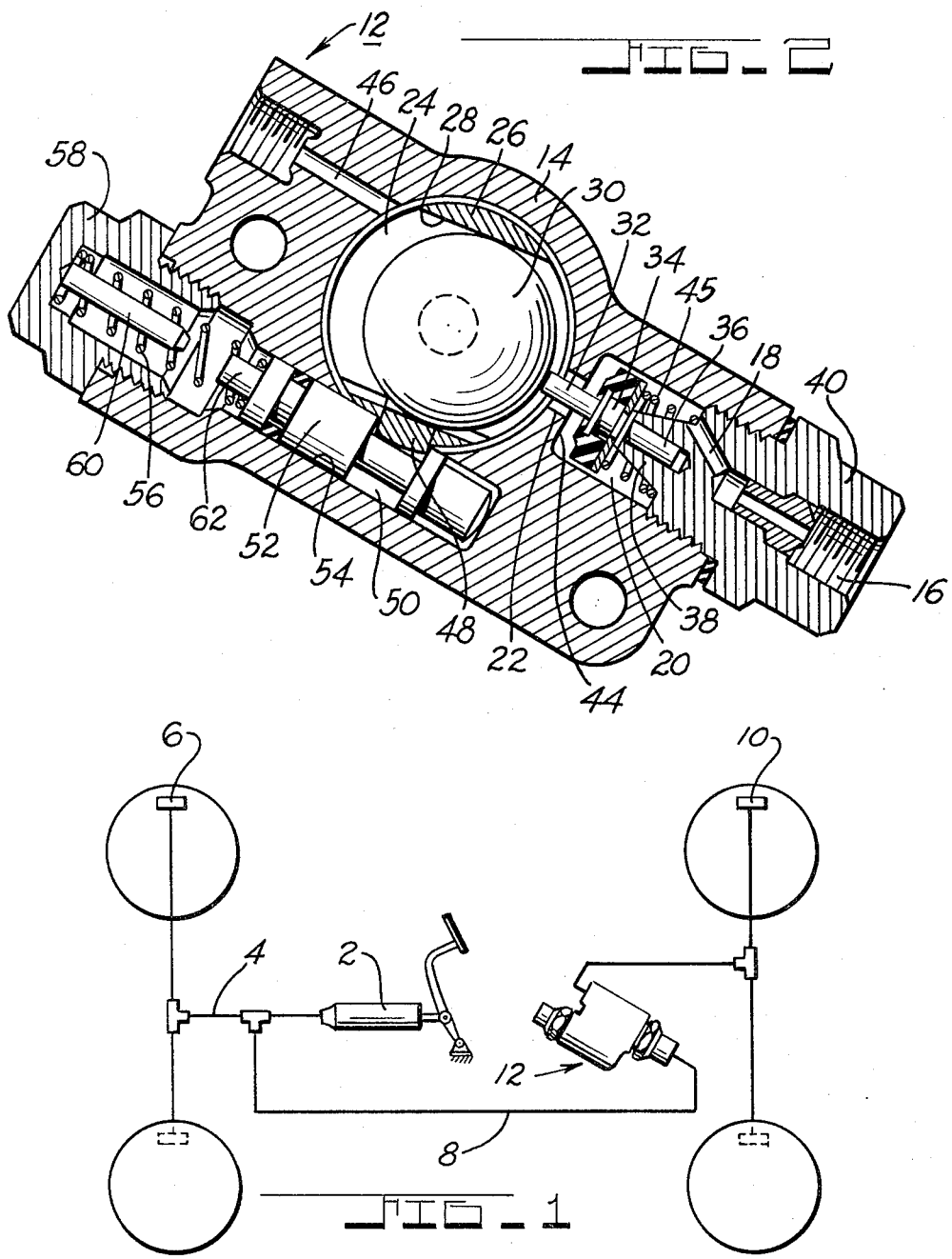

3,383,139
INERTIA BRAKE VALVE
Gérard Chevreux, Bois-Colombes, France, assignor to
Societe Anonyme D.B.A., Paris, France
Filed May 16, 1966, Ser. No. 550,487
Claims priority, application France, May 19, 1965,
17,536
2 Claims. (Cl. 303—24)

ABSTRACT OF THE DISCLOSURE

A device for limiting hydraulic pressure to a given constant level whenever a deceleration responsive valve senses a predetermined deceleration including a mechanism to permit the adjustment of the deceleration responsive valve in accordance with load conditions of structure with which the valve is associated.

---

In prior hydraulic brake systems equipped with a brake regulator of the type defined above, the shutting off of the brake circuit connected to one of the brakes took place when the deceleration of the vehicle attained a predetermined value regardless of the fact whether the vehicle was lightly loaded or whether the vehicle carried the maximum load of freight and/or of passengers. Prior art devices were designed primarily for a balance between a lightly loaded vehicle and a maximum loaded vehicle by taking into account load transfer from the rear axle to the front axle. In such devices the brake regulator was unable to realize a satisfactory braking operation when the vehicle was empty, and vice versa.

Accordingly, it is an object of the invention to provide a brake regulator which is capable of operating over the entire load range of a vehicle.

A more particular object of the invention is to provide a regulator for a hydraulic brake system in which the master cylinder is connected by operating circuits to the brakes on the front and rear axles, whereby a communication through the one of the circuits at least is terminated when the deceleration of the said gravity member attains a predetermined value which is a function of the hydraulic pressure generated in that one circuit.

A further object of the invention is to provide a regulator for hydraulic brake systems in which the master cylinder is connected by operating circuits to the brakes on the different axles including a gravity-operated member located on an inclined ramp with means to vary the slope of said ramp as a function of the brake applying pressure to thereby modify the force of deceleration required to actuate the regulator.

Still a further object of the invention is to provide a regulator for a hydraulic brake system in which the master cylinder is connected by operating circuits to the brakes on the different axles, where the brake regulator mounted in one of said circuits includes a gravity-operated member located on an inclined ramp and cooperating with a check valve member, and a means to vary the slope of the ramp by a spring-loaded piston operatively connected to said ramp and responsive to the braking pressure applied to the one circuit whereby the movement of said piston under the effect of said pressure is adapted to vary the slope of said ramp.

Still a further object of the invention is to provide a regulator for a hydraulic circuit connecting the master cylinder to one of at least two brake means, including a housing in which is rotatably mounted a bushing having a transversal cylindrical bore therein forming a ramp on which is mounted a gravity-operated member, and a piston operatively connected to the bushing which is subjected to the pressure in the circuit and the movement of which is adapted to rotate the bushing and thus vary the slope of said ramp.

Finally, another object of the invention is to provide a brake regulator including means to limit the slope of the ramp on which is mounted a gravity-operated member and thus cause a termination of hydraulic pressure in response to the hydraulic pressure applied by the master cylinder to a circuit connecting the master cylinder to the brakes on one of the axles for a vehicle, under the control of said gravity-operated member, and a check valve member controlled by the gravity-operated member controlling the communication through the said circuit.

The features of the invention will appear more fully from the following specification with reference to the accompanying drawings in which:

FIGURE 1 is a diagrammatical view of a brake system equipped with a brake regulator located in a housing with a ramp variable in response to hydraulic pressure generated by the master cylinder in the circuit on which said regulator is mounted, and FIGURE 2 shows in section the details of the brake regulator embodying the invention, mounted in the brake system of FIGURE 1.

The braking system shown in FIGURE 1 comprises a master cylinder 2 directly connected by means of an operating circuit 4 to the cylinders 6 which, in the illustrated embodiment, are mounted on the front axle. An operating circuit 8 connects the master cylinder to the cylinders 10 mounted on the rear axle. A brake regulator generally designated by reference numeral 12, and the details of which are shown in the FIGURE 2 is placed in the circuit 8, as seen.

The circuit 8 is connected to the housing 14 of the brake regulator 12 and communicates with said housing through the intermediary of inlet port 16. This port is connected by a passage 18 to a cylindrical compartment 20, the upper part of which communicates by a passage 22 with a cylindrical chamber 24. In this chamber 24 is mounted a cylindrical bushing 26 formed with a cylindrical bore 28. On this bore 28 is formed an arcuate ramp on which is adapted to move a gravity-responsive ball 30.

This ball 30 is normally in abutment against the stem 32 of the check valve 34, the pin 36 of which is adapted to slide in a cylindrical bore formed in a conical projection 38 extending from a coupling 40 in which is threaded in the inlet port 16. The coupling 40 is tightly screwed into the lower portion of the cylindrical compartment 20.

The check valve 34 is provided with a conventional sealing ring and is biased into engagement with an annular seat 44 about the passage 22 by a spring 45 that opposes the weight of the ball 30 under normal conditions.

The chamber 24 is open to a second passage 46 leading to an outlet port to which the circuit 8 is connected to communicate with hydraulic cylinders 10 mounted on the rear axle.

On the lower portion of the bushing 26 are formed two opposite cutouts thus defining a projection 48 extending into an annular recess 50 formed in a piston 52 adapted to slide in a cylindrical bore 54. The piston 52 is biased by a compression spring 56, arranged between a second coupling 58 screwed into the housing and to the bottom of which is secured a pin 60 arranged to limit the stroke of the piston 52 and thus to avoid the escape of the bushing projection 48 from its recess 50, and in addition to limit the rotation of the bushing 26 beyond an angle which would assign an excessive slope to the ramp formed on the inner surface of said projection. It is to be noted that one end of the spring 56 is guided by the pin 60 and at the opposite end by a reduced-diameter extension 62 formed on the piston 52.

The housing 14 is formed with two opposite holes through which extend means (not shown) for securing said housing on a fixed part of the vehicle to confer to the ramp formed on the bushing a sufficient slope in order that the weight of the ball 30 applies to the check valve 34 a force larger than that applied by the spring 45, so that in normal position, and until the deceleration of the vehicle attains a predetermined value, a free communication is provided between the compartment 20 and the chamber 24 of the regulator 12.

When the master cylinder is set into action, the hydraulic pressure is increasing in the two braking circuits and during the initial stage this pressure is insufficient to generate a deceleration adapted to apply to the ball 30 an inertia force sufficiently large to overcome, with the assistance of the spring 45, the ball weight action onto the check valve 34. Consequently this check valve will remain open and the same pressure will therefore subsist in the two circuits, as set forth above. At the same time, under the action of this pressure which acts in opposition to the action of spring 56, the piston 52 is moved and carries therewith the bushing through the intermediary of the projection 48 which assigns a rotation in the clockwise direction of the bushing and an increase of the slope of the ramp formed on said bushing. This slope has a determined value for each value of hydraulic pressure; the diameter of the piston 52, on the one hand, and the load of the spring 56 as well as the initial slope of the ramp, on the other hand, are designed in such a manner that for each value of the vehicle load there exists a hydraulic pressure of such a magnitude that the inertia force applied to the ball 30 is sufficient, with contribution of the spring 45, to overcome for the initial braking stages the action of the weight of the ball 30. The effect of these two forces (inertia force and force of the spring 45) exceeding that of the ball for higher braking stages, results in retraction of the ball 30 along the ramp, and in closure of the check valve 34.

The abutment pin 60 has for its object to limit, for hydraulic pressures in excess of a determined intensity, the displacement of the piston 52 and, consequently the slope of the ramp. Under these conditions, as soon as the hydraulic pressure in the circuits exceeds said value, the ball retracts which enables the application of the check valve 34 onto its seat 44.

It is thus possible to determine the law of variation of the slope of the ramp as a function of the hydraulic pressure by a suitable selection of the initial slope of the ramp, of the diameter of the piston 52 and of the flexibility of the spring 56, so that, as stated above, for each vehicle load condition there exists a hydraulic pressure adapted to assign to the vehicle such a deceleration that the inertia force acting onto the ball be sufficient, with the contribution of the spring 45, to overcome the action exerted by the weigth of the ball. As compared with prior brake regulators in which the check valve closure point was responsive to a predetermined deceleration, the present invention provides the advantage consisting in that the check valve closure point varies in accordance with the load of the vehicle.

It is to be noted that the spring loaded piston 52 operatively connected to the bushing 26 is adapted to realize the following advantage. When the check valve 34 is closed to shut off the passage 22, said spring-loaded piston is adapted to insure a constant pressure in the circuit 8 connected to the hydraulic cylinders 10 on the rear axle, in spite of variations of the liquid volume which might occur in the said circuit, namely due to the expansion of the drums equipping the rear axles' brakes.

I claim:

1. For use in a vehicle braking system a brake pressure regulating device for location between a hydraulic master cylinder and pressure responsive means operatively connected to brake means for limiting the brake pressure therein to a given constant level when the vehicle deceleration has reached a predetermined value, said device comprising:

a housing, said housing including an inlet port in the housing with a compartment in the housing in communication with said inlet port with a passage in said housing leading from said compartment to a chamber within said housing which chamber is connected to an outlet port of said housing, said outlet port providing a communication between said chamber and the pressure responsive means of the brakes;

a check valve member in said compartment located between the inlet port and the passage from said compartment;

a spring biasing said check valve member into engagement with the housing about the passage;

an annular bushing rotatably mounted in said chamber to be between said outlet port and said passage, said bushing having a transversal bore forming a ramp within said chamber;

a gravity-operated member mounted on the said ramp and exerting, in a normal position and during the initial brake stages, onto the said check valve member a force in opposition to that exerted by said spring to maintain fluid communication between said compartment and said chamber via said passage;

a bore in the housing open to said chamber;

an actuating piston mounted in said bore, said piston being arranged in said bore to be exposed on one end thereof to fluid pressure within said chamber and having a spring operatively connected to the other end of said piston to bias said piston in opposition to the fluid pressure in said chamber, said bore being closed by a means to adjustably regulate the force of said spring; and means providing an operative connection between said piston and said bushing whereby the pressure in said chamber acts on said piston to rotate said bushing to vary the slope of said ramp, and whereby deceleration forces exerted on the gravity-operated member to close said check valve member can be varied in accordance with pressure in said chamber in opposition to said spring.

2. A hydraulic brake system comprising:

a master cylinder;

conduit means connected to said master cylinder;

a brake regulator connected to said conduit means, said brake regulator including, a housing having an inlet port to which said conduit means from said master cylinder is connected and an outlet port with a compartment in open communication with the inlet port, a chamber connected by a first passage to the compartment and by a second passage to the outlet port and a bore in open communication with the chamber, valve means operatively arranged within said compartment to control fluid communication from said compartment to said first passage, a spring arranged said housing and said valve means to normally urge said valve means to terminate communication of said compartment to said first passage, a bushing within said chamber rotatably mounted between said first and second passages, said bushing having an axial ramp, a ball operatively arranged in said bushing so as to normally urge said valve means to open the communication of said compartment to said first passage,
a piston within said bore and operatively connected to said bushing such that fluid pressure from said chamber controls the attitude of said piston and consequently the attitude of said bushing and the incline of said ramp,
a spring operatively arranged between said housing and said piston so as to position said piston to the rear of said bore whereupon said ramp is inclined in its most minimum angle, and
an abutment pin affixed to said housing ahead of said piston to limit movement of said piston and consequently the slope of said ramp; and
wheel cylinder means operatively connected to said outlet port of said brake regulator for receiving a pressure that is a function of deceleration forces determined by said ball and hydraulic pressure in said chamber which is, in turn, a function of loading for a vehicle using said hydraulic system.

References Cited
UNITED STATES PATENTS 3,140,124   7/1964   Heiland _____ 303—6
3,317,251   5/1967   Hambling et al. _____ 303—6

FERGUS S. MIDDLETON, *Primary Examiner.*

MILTON BUCHLER, *Examiner.*

J. McLAUGHLIN, *Assistant Examiner.*

UNITED STATES PATENT OFFICE
CERTIFICATE OF CORRECTION

Patent No. 3,383,139                                     March 14, 1968

Gérard Chevreux

It is certified that error appears in the above identified patent and that said Letters Patent are hereby corrected as shown below:

Column 3, line 63, "weigth" should read -- weight --.
Column 4, line 68, after "arranged" insert -- between --.

Signed and sealed this 25th day of November 1969.

(SEAL)
Attest:

Edward M. Fletcher, Jr.                          WILLIAM E. SCHUYLER, JR.
Attesting Officer                                          Commissioner of Patents